United States Patent
Van Vuuren et al.

(10) Patent No.: US 12,123,511 B2
(45) Date of Patent: Oct. 22, 2024

(54) AIR VALVE

(71) Applicant: University of Pretoria, Pretoria (CA)

(72) Inventors: Stefanus Johannes Van Vuuren, Lynnwood (CA); Marco Van Dijk, Lynnwood (CA); Gert Louis Coetzee, Olympus AH (CA)

(73) Assignee: University of Pretoria, Pretoria, AZ (US)

( * ) Notice: Subject to any disclaimer, the term of this patent is extended or adjusted under 35 U.S.C. 154(b) by 0 days.

(21) Appl. No.: 17/783,838

(22) PCT Filed: Dec. 8, 2020

(86) PCT No.: PCT/IB2020/061629
§ 371 (c)(1),
(2) Date: Jun. 9, 2022

(87) PCT Pub. No.: WO2021/116902
PCT Pub. Date: Jun. 17, 2021

(65) Prior Publication Data
US 2023/0018901 A1     Jan. 19, 2023

(30) Foreign Application Priority Data

| Dec. 10, 2019 | (ZA) | ................................. 2019/08187 |
| Mar. 18, 2020 | (ZA) | ................................. 2020/01689 |
| Aug. 3, 2020 | (ZA) | ................................. 2020/04798 |

(51) Int. Cl.
*F16K 24/04*     (2006.01)

(52) U.S. Cl.
CPC .................................. *F16K 24/044* (2013.01)

(58) Field of Classification Search
CPC ...... F16K 24/042; F16K 24/044; F16K 31/22; F16K 47/023
See application file for complete search history.

(56) References Cited

U.S. PATENT DOCUMENTS

| 4,209,032 | A | | 6/1980 | Drori |
| 5,247,958 | A | * | 9/1993 | Deparis ................. F16K 24/042 251/24 |
| 6,119,712 | A | | 9/2000 | Schiebold |
| 9,958,077 | B2 | * | 5/2018 | Ogen .................... F16K 24/044 |
| 2013/0092255 | A1 | | 4/2013 | Lang et al. |

FOREIGN PATENT DOCUMENTS

| KR | 20110035386 | 4/2011 |
| KR | 20180061442 | 6/2018 |
| WO | 2006108223 | 10/2006 |
| WO | 2009109871 | 9/2009 |
| WO | 2012066487 | 5/2012 |

* cited by examiner

Primary Examiner — Hailey K. Do
(74) Attorney, Agent, or Firm — Boyle Fredrickson S.C.

(57) ABSTRACT

This invention relates to an air valve which includes a deflector positioned inside a float chamber in order to improve the flow of air through the air valve. Further, the air valve includes an upper opening leading from the float chamber and having a transverse cross-section which increases away from the float chamber in order to smooth air flow. The invention further relates to an air valve accessory whereby an air valve can be modified in order to improve air flow therethrough.

16 Claims, 10 Drawing Sheets

AIR VALVE

BACKGROUND OF THE INVENTION

1. Field of the Invention

This invention relates to an air valve. It further relates to a method of modifying an air valve and to an air valve accessory.

2. Discussion of the Related Art

In a liquid pipeline, gas build up can decrease the effective cross-section of the pipeline which has an adverse impact on the flow of liquid through the pipeline. In addition, the trapped gas can cause corrosion, pressure surges and even pump failures. Further, when a liquid pipeline drains, e.g. as a result of a failure (burst) or during maintenance when it is drained through scour valves, the liquid leaving the pipeline will create a decrease in pressure within the pipeline, slowing the emptying process or indeed inhibiting emptying of the pipeline, unless sufficient air intake capacity is provided.

The Inventors are aware of air valves or air release valves which are connected to a liquid pipeline to allow air or other gas to be expelled from the pipeline, e.g. when filling the pipeline, and to allow air to enter the pipeline, e.g. to avoid the creation of a partial vacuum in the pipeline such as when emptying or partially emptying the pipeline.

Air valves of which the Inventors are aware typically include a valve body defining a float chamber within which a float arrangement is provided. A lower opening leading from the chamber is connected or connectable to a pipeline and an upper opening leading from the chamber at a high level is connected or connectable to atmosphere. In use, before the pipeline is filled, the float arrangement is in a lower or open condition in which air can flow freely through the valve. When the pipeline is filled with liquid, air which is displaced from the pipeline by the liquid is discharged through the valve to atmosphere. As the pipeline fills liquid enters the float chamber. As the liquid level in the float chamber increases, buoyancy forces acting on the float arrangement displace the float arrangement upwardly until it reaches an upper or closed condition in which it seals the upper opening and inhibits the flow of further liquid into the float chamber. The valve is typically positioned at a high point in the pipeline so that, in use, any gas in the pipeline accumulates in the float chamber. This gas displaces the liquid in the float chamber and if the level of the liquid in the float chamber decreases sufficiently, the float arrangement moves downwardly thereby opening the valve and permitting the accumulated gas to be discharged.

If the volume of liquid in the pipeline decreases, e.g. when emptying/draining the pipeline or partly emptying/draining the pipeline, the pressure in the float chamber will decrease to atmospheric pressure resulting in the float arrangement moving downwards, thereby opening the valve and permitting air to flow from atmosphere through the valve into the pipeline, limiting the formation of a low pressures or in extreme cases vacuum pressures which will negatively influence the draining process and in some circumstances cause a collapse of the pipeline.

Typically, a sieve or grid is positioned over the upper opening or inlet orifice to inhibit the ingress of foreign matter which could have a detrimental impact on the performance of the valve.

Typically, the valve body comprises a circular bottom, a circular top and a circular cylindrical side wall which extends between the top and the bottom. The top opening is provided by a centrally disposed top orifice in the top and the bottom opening is provided by a centrally disposed bottom orifice in the bottom, the top and bottom orifices are normally of the same diameter. In order to space the float arrangement from the bottom, a float support or baffle plate is supported above the bottom and serves as a stop for the float arrangement when in its lower or open condition to permit airflow through the valve into the pipeline.

Air valves are sized in accordance with their inlet capacity. In order to avoid the problems identified above it is important that an undersized air valve is not used. Factors which are considered in sizing an air valve include atmospheric conditions, such as atmospheric pressure, ambient temperature and moisture content, orifice size, layout of the valve and losses related to the structure of the valve including those associated with the sieve or grid. The top and bottom orifices are typically the same size. However, by virtue of the structure of the valve and the flow paths of the air flow under inlet conditions, through the top orifice and then along the annulus space between the float arrangement and the valve body, past the float support and then through the bottom orifice, creates a differential effective flow rate for the same differential pressure across the top and bottom orifice. This results that all valves with similar size top and bottom orifices and for which the top orifice was used to determine the intake capacity are incorrect and lead to incorrect sizing of the valve.

The Inventors have found that when air flows through the valve, the current construction is such that it results in the creation of stagnation zones and the creation of eddies or turbulence which in turn result in energy losses and the reduction in the efficiency of air flow through the valve.

SUMMARY

It is an object of this invention to provide means which the Inventors believe will at least ameliorate these problems.

According to one aspect of the invention there is provided an air valve accessory, which includes an air guide insert which can be positioned in a float chamber of an air valve and which is configured to improve the flow of air through the air valve and/or an external air guide which can be positioned adjacent to the top opening and outside of the float chamber in order to improve the flow of air through the top opening, into the air valve.

The air guide insert may include a center element and a support arrangement which is configured to support the center element in alignment with and spaced from the bottom orifice and/or an annular lower element which is configured to be positioned adjacent to a corner formed between the bottom and the sidewall and which has an annular inner surface which serves to smooth the airflow and/or an annular upper element which is configured to be positioned adjacent to a corner formed between the top and the sidewall and which has an annular inner surface which serves to smooth the airflow.

The center element may have a downwardly facing deflector surface, the width of which increases away from a central point to a periphery thereof.

The deflector surface may be generally in the form of an inverted dome, the shape of the inverted dome being configured to guide the flow of air towards an annulus space on the inside of the body and being formed in such a way that it can be inserted into and fitted within the dimensional form of the air valve.

The support arrangement may include angularly spaced apart radial ribs which are connected to and extend between the center element and the lower element which serve to maintain the center element and the lower element in a desired spatial relationship in which they define between them an annular flow path which leads from the inlet orifice to a position adjacent to the float support.

The inner surface of the upper element may be concave to smooth air flow between the float chamber and the outlet orifice.

The support arrangement may include circumferentially spaced apart elongate support members which are connected to the center element and the upper element.

The air guide insert may be formed of unitary construction, in particular, it may be formed of a synthetic plastics material by moulding, 3-D printing or the like.

The external air guide may be configured to improve the flow of air from atmosphere into the valve.

The external air guide may include a body which defines a flow path which extends through the body and has an inner end and an outer end which open out of the body, the flow path having a transverse cross-section, the area of which decreases smoothly from the outer end to the inner end.

The flow path may have a curvature. The shape of the curvature may be defined by the bottom nappe of the flow lines when excessive turbulence is prevented. Reference to the shape, is the so-called Ogee form, which has now been improved to include the upstream geometry, orientation of the inlet and curvature of the inlet and is now known as the VC Ogee relationship. The form for the different layouts will be defined with a view to optimising flow.

The external air guide may include a sieve or grid connected in flow communication with the outer end of the flow path.

The sieve or grid may be connected to the body.

The air valve accessory may be formed of unitary construction. More particularly, the accessory may be formed of a synthetic plastics material, e.g. by moulding, additive manufacturing or the like.

The sieve or grid may be annular, and an axially inner portion of the sieve or grid may extend longitudinally inwardly beyond an outer end of the body.

According to another aspect of the invention, there is provided a method of modifying an air valve which includes the step of positioning an air guide insert within the float chamber which air guide insert is configured to smooth the flow of air through the float chamber and/or positioning an external air guide adjacent to the top opening and outside of the float chamber in order to improve the flow of air through the top opening, into the air valve.

The air guide insert and/or the external air guide may be part of an air valve accessory as described above.

In this way the Inventors believe the energy losses of air flowing through the valve can be reduced thereby increasing the efficiency of the valve.

According to another aspect of the invention, there is provided an air valve which includes an accessory of the type described above.

According to a further aspect of the invention, there is provided an air valve which includes:

a valve body defining a float chamber within which a float arrangement is provided;

a lower opening leading from the chamber which is connected or connectable to a pipeline;

an upper opening leading from the chamber at a high level which is connected or connectable to atmosphere; and a deflector surface which faces the lower opening, and which has a transverse cross-section which increases inwardly away from the lower opening in order to smooth fluid flow through the lower opening into the float chamber and/or from the float chamber out of the lower opening.

The valve body may comprise a circular bottom, a circular top and a circular cylindrical side wall which extends between the top and the bottom, the intersections between the sidewall and at least one of the top and the bottom being concave to provide a curved surface to smooth airflow and prevent the build-up of stagnant areas or eddies in the float chamber.

At least part of the upper opening may have a transverse cross-section which increases away from the float chamber in order to smooth airflow through the upper opening into the float chamber and/or from the float chamber out of the upper opening.

According to a further aspect of the invention, there is provided an air valve which includes:

a valve body defining a float chamber within which a float arrangement is provided;

a lower opening leading from the chamber which is connected or connectable to a pipeline;

an upper opening leading from the chamber at a high level which is connected or connectable to atmosphere, at least part of the upper opening having a transverse cross-section which increases away from the float chamber in order to smooth airflow through the upper opening into the float chamber and/or from the float chamber out of the upper opening.

The lower opening may be of larger diameter than the minimum diameter of the upper opening.

According to another aspect of the invention, there is provided an air valve which includes:

a body defining a float chamber within which a float arrangement is provided;

a lower opening leading from the chamber which is connected or connectable to a pipeline; and an upper opening leading from the chamber at a high level which is connected or connectable to atmosphere, the lower opening being of larger diameter than the minimum diameter of the upper opening According to a further aspect of the invention, there is is provided a method of modifying an air valve which includes the step of positioning an air guide outside the float chamber adjacent to the top opening which air guide is configured to smooth the flow of air into the float chamber and/or from the float chamber through the top opening.

The method may include removing an existing sieve or grid from the valve body and mounting an external air guide of an air valve accessory as described above to the top plate with the passage in the body aligned with the top opening in the top plate.

The external air guide may be provided with mounting holes which correspond with the mounting holes in the original sieve and the body, the external air guide being secured to the top plate by fasteners extending through the mounting holes.

The inner end of the flow passage may have a diameter which corresponds substantially with the diameter of the top opening.

According to another aspect of the invention, there is provided a method of designing an air valve which includes the step of ensuring that flow rate through the valve is determined by the top orifice.

According to a further aspect of the invention, there is provided a method of modifying an air valve which includes a valve body comprising a circular bottom, a circular top and a circular cylindrical side wall which extends between the top and the bottom, the upper or top opening being provided by a centrally disposed top orifice in the top and the lower or bottom opening being provided by a centrally disposed bottom orifice in the bottom, the method including modifying the structure of the valve to ensure that the flow rate through the valve is determined by the top orifice.

The method may include modifying the size of the bottom orifice such that air flow through the bottom orifice and the float chamber is more restricted than through the top orifice so that if a valve having an appropriately specified bottom orifice is used the valve will meet the flow rate requirements of the intended application.

The method may include replacing at least one of the top and/or the bottom with a replacement top or bottom such that the top orifice has a smaller cross-sectional area than the bottom orifice.

The method may include replacing the bottom orifice with an orifice of larger diameter.

According to another aspect of the invention, there is provided an air valve which includes:
 a valve body defining a float chamber within which a float arrangement is provided;
 a lower opening leading from the chamber which is connected or connectable to a pipeline;
 an upper opening leading from the chamber at a high level which is connected or connectable to atmosphere the upper opening having a cross-sectional area which is smaller than that of the lower opening.

The lower opening may be of larger diameter than the minimum diameter of the upper opening.

BRIEF DESCRIPTION OF THE DRAWINGS

The invention will now be described, by way of example, with reference to the accompanying diagrammatic drawings.

In the drawings.

DETAILED DESCRIPTION OF EXAMPLE EMBODIMENTS

Figure 1:
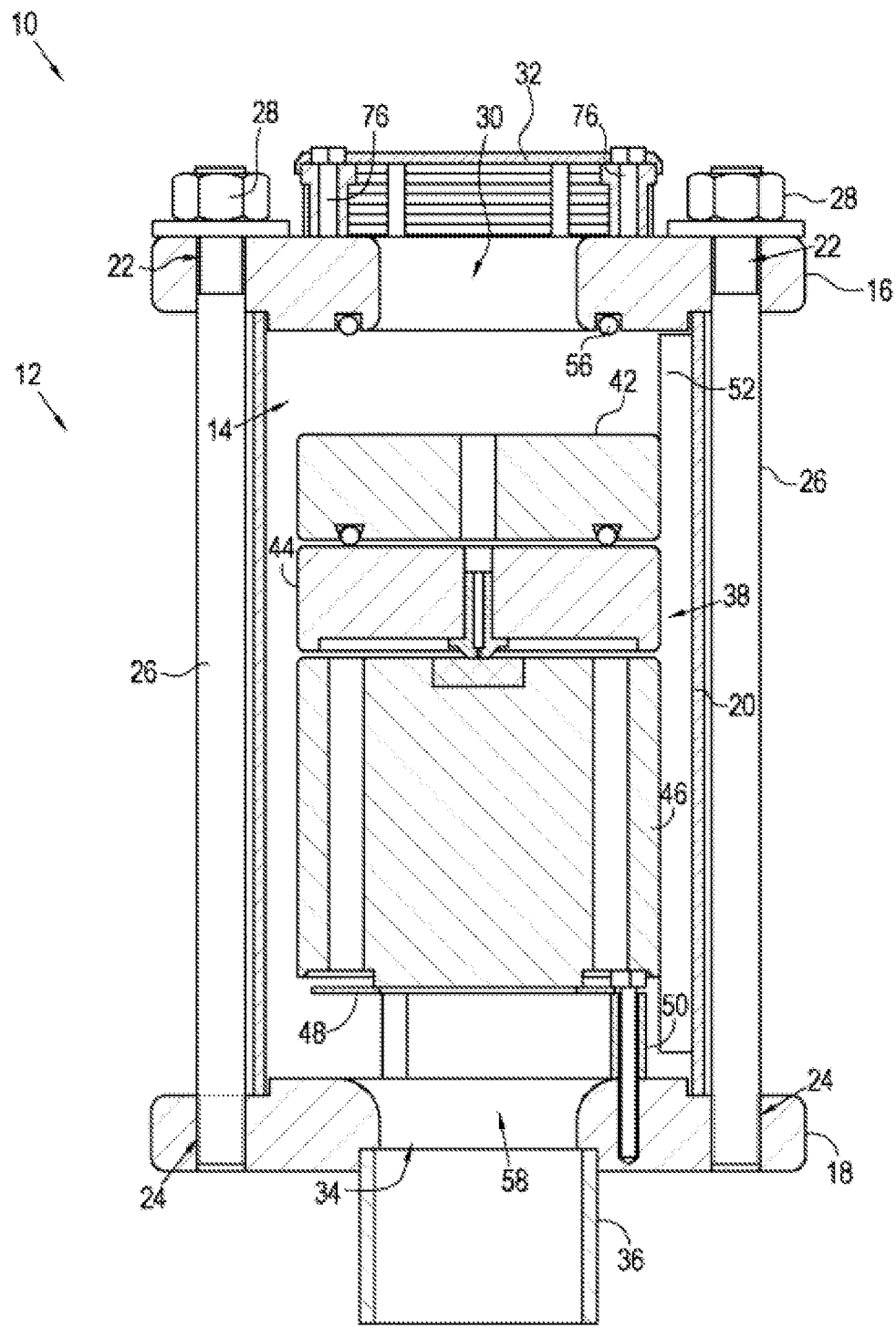
FIG. 1 shows a sectional elevation of a prior art air valve with a float arrangement in an open position.

The following description of the invention is provided as an enabling teaching of the invention. Those skilled in the relevant art will recognise that many changes can be made to the embodiments described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention. Thus, the following description is provided as illustrative of the principles of the present invention and not a limitation thereof With reference to FIGS. 1 and 2 of the drawings, reference numeral 10 refers generally to a prior art air valve.

The air valve 10 includes a valve body, generally indicated by reference numeral 12 defining a float chamber, generally indicted by reference numeral 14.

More particularly, the valve body 12 has a circular top or upper flange 16, a circular bottom or lower flange 18 and a circular cylindrical sidewall or barrel 20.

The top 16 has a plurality of circumferentially spaced holes 22 extending therethrough. The bottom 18 has a plurality of circumferentially spaced threaded holes 24 therein, the holes 24 in the bottom 18 being in register with the holes 22. A stud 26 having a screw-threaded end is screwed into each of the holes 24, the studs extending through the holes 22 and nuts 28 being screw-threadedly mounted on protruding end portions of the studs 26 such that the sidewall 20 is sandwiched between the top 16 and bottom 18.

A top opening or top orifice 30 extends through the top 16 and a top cover 32 in the form of a grid or sieve arrangement is mounted to the top 18 in order to permit the flow of air through the top orifice 30 but inhibit the ingress of foreign matter into the valve body.

A centrally disposed opening or bottom orifice 34 extends through the bottom 18 and is connected, in use, by a length of pipe 36 to a pipeline.

A float arrangement, generally indicated by reference numeral 38, is positioned in the float chamber 14. In this particular embodiment, the float arrangement includes three stacked float members, namely, a top float member 42, an intermediate float member 44 and a bottom float member 46.

In order to support the bottom float member 46 above the bottom 18, the valve 10 includes an annular baffle plate 48 which is supported above the bottom 18 by circumferentially spaced spacers 50.

A plurality of circumferentially spaced-apart float guides in the form of rods 52 is provided in the float chamber in order to guide the float members 42, 44, 46.

Figure 2:
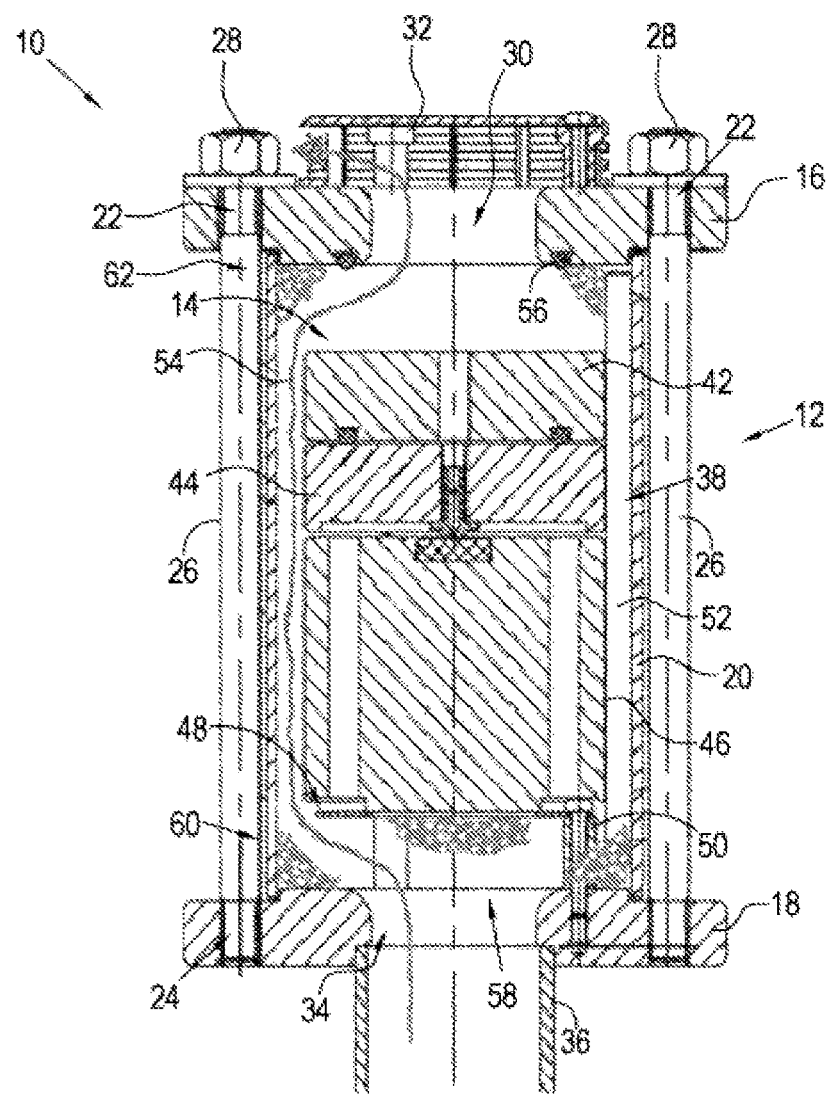
FIG. 2 illustrates the flow of air through the valve of FIG. 1.

In use, when a pipeline to which the air valve 10 is connected is empty, i.e. when no liquid is flowing therethrough, the float arrangement 38 will be in the position shown in FIGS. 1 and 2 of the drawings in which the bottom float member 46 rests on the baffle plate 48. As liquid is introduced into the pipeline, the air contained therein is displaced and passes through the annular space defined through the length of pipe 36 and the bottom orifice 34 into the float chamber 14. With reference now in particular to FIG. 2 of the drawings, as indicated by arrow 54 the air passing through the bottom orifice 34 is deflected laterally and passes through the annular space defined between the radially outer edges of the float members 42, 44, 46 and the radially inner surface of the sidewall 20. As the air passes the top float member 42 it is deflected laterally inwardly where it passes through the top orifice 30 and is displaced laterally outwardly through the top cover 32.

As the pipeline fills with liquid, liquid enters the float chamber 14 through the bottom orifice 34. As the liquid level in the float chamber 14 rises, the floats of the float arrangement 38 are displaced upwardly due to the buoyancy forces acting thereon until the top float member 42 abuts against an annular seal 56 provided on the top 16 thereby effectively closing the top orifice 30.

The air valve 10 is typically positioned at a high point in the pipeline such that any gas within the pipeline accumulates at the highpoint and enters the float chamber 14 thereby displacing the liquid contained within the float chamber 14. Should the liquid level within the float chamber 14 fall below a certain level such that the float arrangement 38 moves downwardly, air which has accumulated in the float chamber 14 will be expelled through the top orifice 30 and the float arrangement 38 will once again move upwardly as the liquid level rises in order to close the top orifice 30.

If the pipeline is being emptied and the liquid level drops within the float chamber 14, the float arrangement 38 will move downwardly permitting air to enter the float chamber 14 through the top cover 32 and the top orifice 30. The air will flow into the pipeline along the path shown by arrow 54 but in the opposite direction.

The Inventors have found that when air flows through the float chamber 14, particularly during the intake of air through the air valve 10, zones of stagnation, eddies, high turbulence or energy loss result which reduce the efficiency of the airflow through the valve 10. In particular, as illustrated in FIG. 2 of the drawings, there is a central zone, generally indicated by reference numeral 58 positioned below the float arrangement 38 in line with the bottom orifice 34 in which stagnant areas or eddies tend to form. Further, there is a bottom zone, generally indicated by reference numeral 60 at the intersection of the sidewall 20 and the bottom 18 where stagnant areas or eddies form. Similarly, there is an annular top zone, generally indicated by reference numeral 62 at the intersection of the sidewall 20 and the top 16 in which a stagnant area or eddies may form.

It will be appreciated that the specific float arrangement 38 described above is intended for illustrative purposes only and that the specific float arrangement of an air valve could vary.

Figure 3:
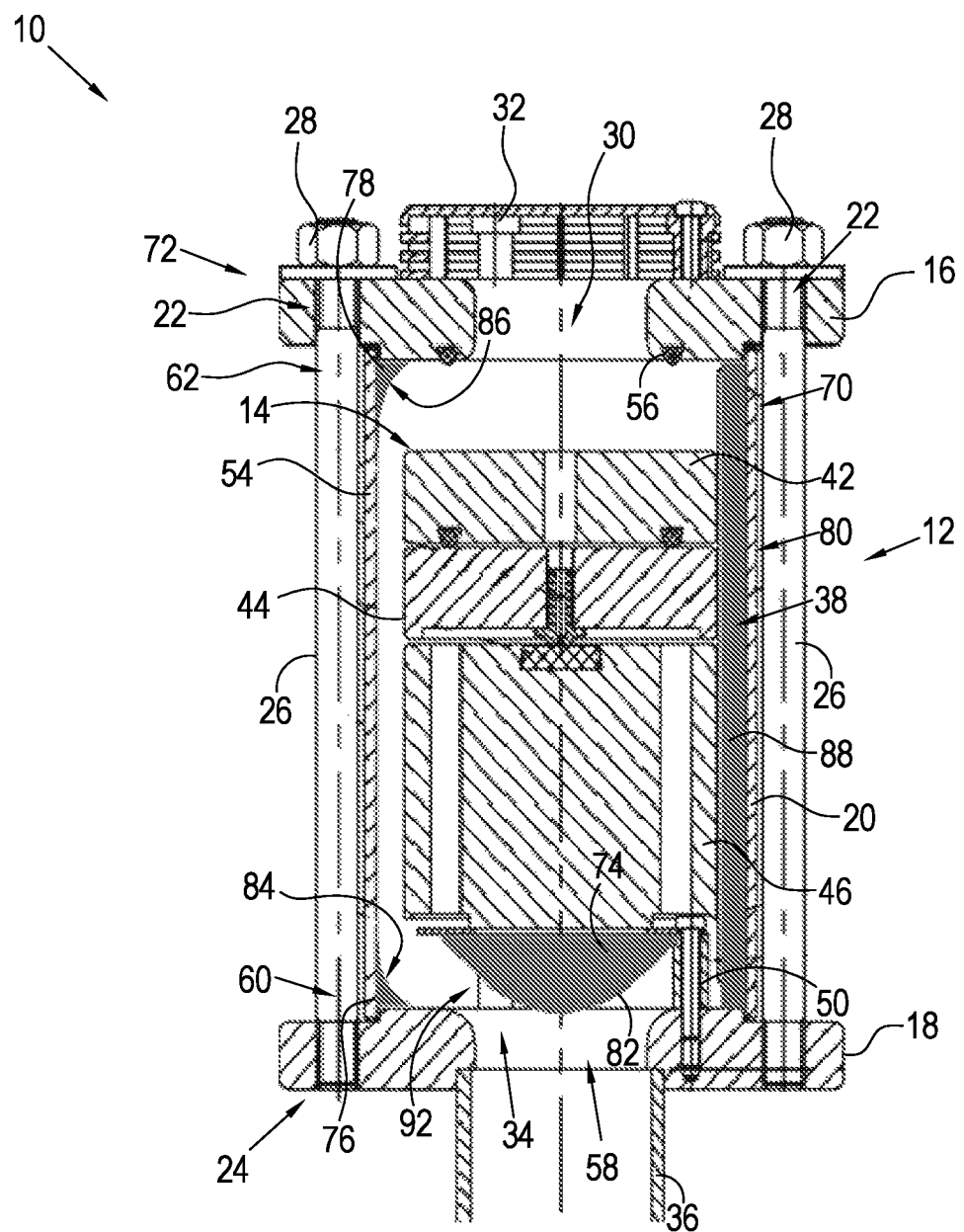
FIG. 3 shows a sectional elevation, similar to FIG. 1, of an embodiment of an air valve in accordance with the invention which incorporates an air guide insert in accordance with the invention.
Figure 4:
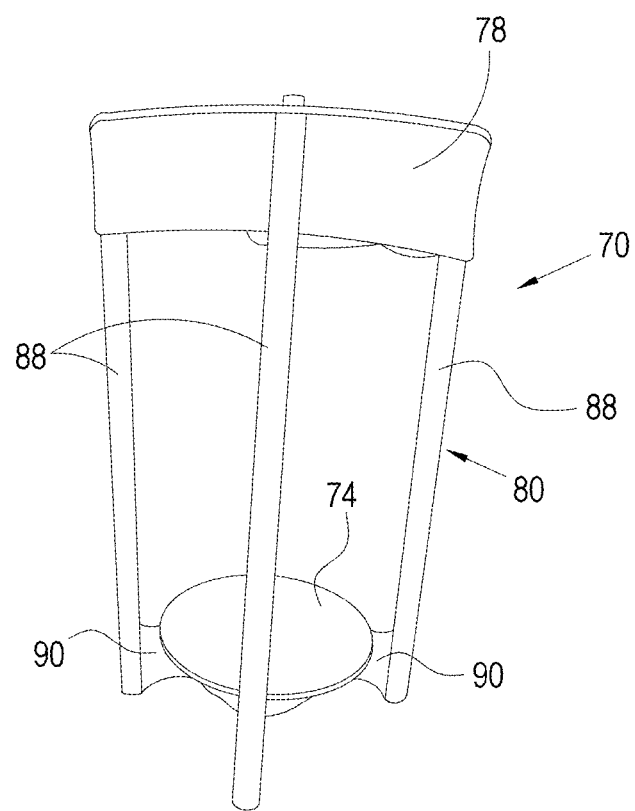
FIG. 4 shows a three-dimensional view of the air guide insert of FIG. 3 with the lower element omitted for ease of illustration.

Reference is now made to FIGS. 3 and 4 of the drawings, in which reference numeral 70 refers generally to an air guide insert and, unless otherwise indicated, the same reference numerals used above are used to designate similar parts. The air guide insert 70 is intended for use with an air valve 10 and, in FIG. 3 of the drawings, reference numeral 72 refers generally to an air valve in accordance with the invention which incorporates an air guide insert 70.

The air guide insert 70 includes a center element 74, an annular lower element 76 (omitted for illustrative purposes from FIG. 4), an annular upper element 78 and a support arrangement, generally indicated by reference numeral 80, which connects the center element 74, lower element 76 and upper element 78 together and supports them in a desired spatial relationship.

The center element 74 has a downwardly facing curved deflector surface 82. To this end, the center element 74 is generally in the form of an inverted dome such that the width of the deflector surface 82 increases away from a central or low point to a periphery thereof.

As can be seen in FIG. 3 of the drawings, the annular lower element 76 is configured to be a snug fit at the intersection of the sidewall 20 and the bottom 18 and has a radiused inner surface 84. Similarly, the upper element 78 is configured to be a snug fit at the intersection of the sidewall 20 and the top 16 and has a radiused inner surface 86.

The support arrangement 80 includes a plurality of circumferentially spaced longitudinally extending elongate support members 88 which extend between the lower element 76 and the upper element 78. The support arrangement 80 further includes radially extending ribs 90 (FIG. 4) which extend between the center element 74 and the lower element 76 and/or the support members 88. The ribs 90 are relatively narrow in order to minimise their influence on airflow through the valve.

In order to install the air guide insert 70 in an air valve such as the air valve 10, the nuts 28 are undone to permit the valve body 12 to be disassembled. The float arrangement is removed and the baffle plate 48 is removed. The air guide insert 70 is then inserted into the float chamber 14 and the valve body 12 is reassembled including the mounting of the baffle plate 48.

As shown in FIG. 3 of the drawings, the lower element 76 will be positioned adjacent to the intersection of the sidewall 20 and the bottom 18 and the upper element 78 will be positioned adjacent to the intersection of the sidewall 20 and the top 16. The center element 74 is positioned directly below the baffle plate and in register with the bottom orifice 34.

The support members 88 can function to guide the float arrangement 38 and accordingly, the float guides 52 can be removed.

The inner surface 84 of the lower element 76 and the deflector surface 82 of the center element 74 define between them a smoothly curving flow path, generally indicated by reference numeral 92, which serves to deflect air flowing through the bottom orifice 34 outwardly such that it flows around the float arrangement, in the manner described above, whilst reducing the formation of stagnant areas or eddies and minimising losses. Similarly, the curved inner surface 86 serves to deflect the airflow towards the top of orifice 30 in a manner which minimises losses thereby improving airflow through the air valve 72 and improving the efficiency of the operation of the valve. Naturally, when air is flowing through the valve in the opposite direction, i.e. into the pipeline, the provision of the air guide insert 70 improves the efficiency of air flow in the same manner described above.

It will be appreciated that an air guide insert 70 can be retrofitted to an existing air valve or the air valve may be designed and manufactured with appropriate deflector surfaces in order to smooth airflow through the air valve.

In addition, for a particular air valve, the invention may include analysing the flow of air through the air valve and designing an accessory for that valve in order to decrease the formation of stagnant areas or eddies in order to optimise airflow through the valve.

Figure 5:
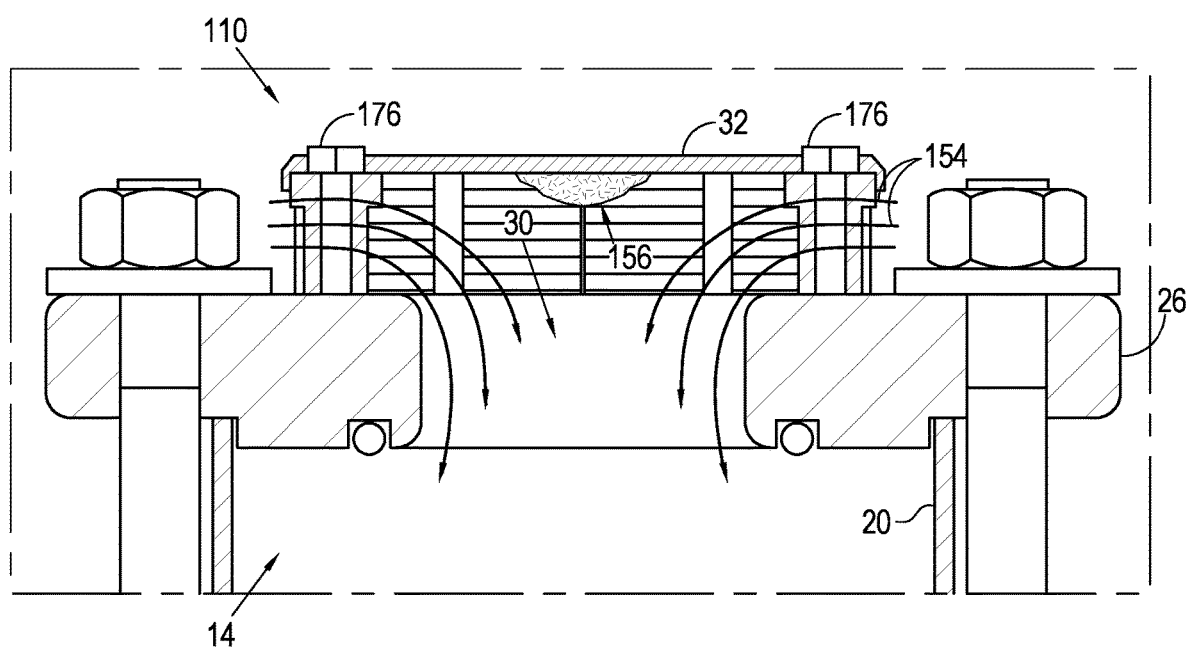
FIG. 5 shows, on an enlarged scale, a sectional elevation of an upper part of the air valve of FIG. 1 illustrating the flow of air into the valve.

With reference to FIG. 5 of the drawings, reference numeral 110 refers generally to an upper part of the prior art air valve of FIGS. 1 and 2 and unless otherwise indicated, the same reference numerals used above are used to designate similar parts.

As mentioned above, if the pipeline to which the valve is connected is being emptied or partially emptied, and the liquid level drops within the float chamber 14, the float arrangement 38 will move downwardly permitting air to enter the float chamber 14 through the top cover 32 and the top orifice 30. The air will flow into the float chamber through the top orifice 30 along the path shown by arrow 154 in FIG. 5 of the drawings.

The Inventors have found that when air flows into the valve through the top orifice 30 a centrally disposed area, generally indicated by reference numeral 156, forms where partial stagnation and high eddies or turbulence are generated.

The intake capacity of an air valve is regarded as the most important operational characteristic when determining the air valve size. In this regard, reference is made to the European standard prEN 1074-4 Part 4 Final Draft (February 2000) procedure for determination of the intake capacity of air valves, in which it is indicated that the top orifice is the controlling orifice, defining the intake characteristics.

The mass flow rate for subsonic flow conditions (un-choked conditions where $p/p_a > 0{,}528$) and sonic flow conditions (choked conditions where $p_a/p \leq 0{,}528$) can be determined by the following relationships.

Air intrusion through the air valve $(p_a > p)$ (3.1)

Un-choked conditions $(p/\rho_a > 0.528)$ $$\dot{m} = Cd_i A_i \left\{ 2 p_a \rho_a \left( \frac{k}{k-1} \right) \left[ \left( \frac{p}{p_a} \right)^{2/k} - \left( \frac{p}{p_a} \right)^{(k+1)/k} \right] \right\}^{0,5}$$

Choked conditions $(p/\rho_a \leq 0.528)$ (3.2)

$$\dot{m} = Cd_i A_i \left\{ k p_a \rho_a \left[ \frac{2}{k-1} \right]^{(k+1)/(k-1))} \right\}$$

Where:
$A_i$=Flow area for air inflow (m²)
$Cd_i$=Discharge coefficient for the inlet area of the air valve.
$Cd_j = Cc_j * Cv_j$
where
$Cv_j$=velocity coefficient
$Cc_j$=contraction coefficient
k=Isentropic constant, k=1,4
$\dot{m}$=Mass flow rate (kg/s)
p=Absolute pressure head (m)
$p_a$=Absolute pressure head in the air valve (m)
$\rho_a$=Density of the air in the air valve under the line head conditions (kg/m³)

Reference is now made to FIGS. 6 to 9 of the drawings, in which reference numeral 160 refers generally to an external air guide in accordance with the invention. Unless otherwise indicated, the same reference numerals used above are used to designate similar parts.

The external air guide 160 is intended for use with an air valve 10 and it is configured to be interchangeable with the cover 32.

The external air guide 160 includes a body 162 defining a flow path 164 which extends through and opens out of opposed ends of the body 162. The flow path 164 has an inner end diameter 164.1 and an outer end diameter 164.2 and the transverse cross-sectional area of the flow path 164 decreases smoothly from the outer end 164.2 to the inner end 164.1. More particularly, the curvature of the flow path is defined by the bottom nappe of the flow lines when excessive turbulence is prevented. Reference to the shape, is the so-called Ogee form, which includes the upstream geometry, orientation of the inlet and curvature of the inlet and is known as the VC Ogee relationship. The specific form for the different layouts of valves will be defined to optimise air flow.

The external air guide 160 includes a circular cylindrical grid 166 which is connected (manufactured as a unit) to the body 162 and protrudes therefrom. A circular top 168 is provided at the free end of the grid 166.

Figure 8:
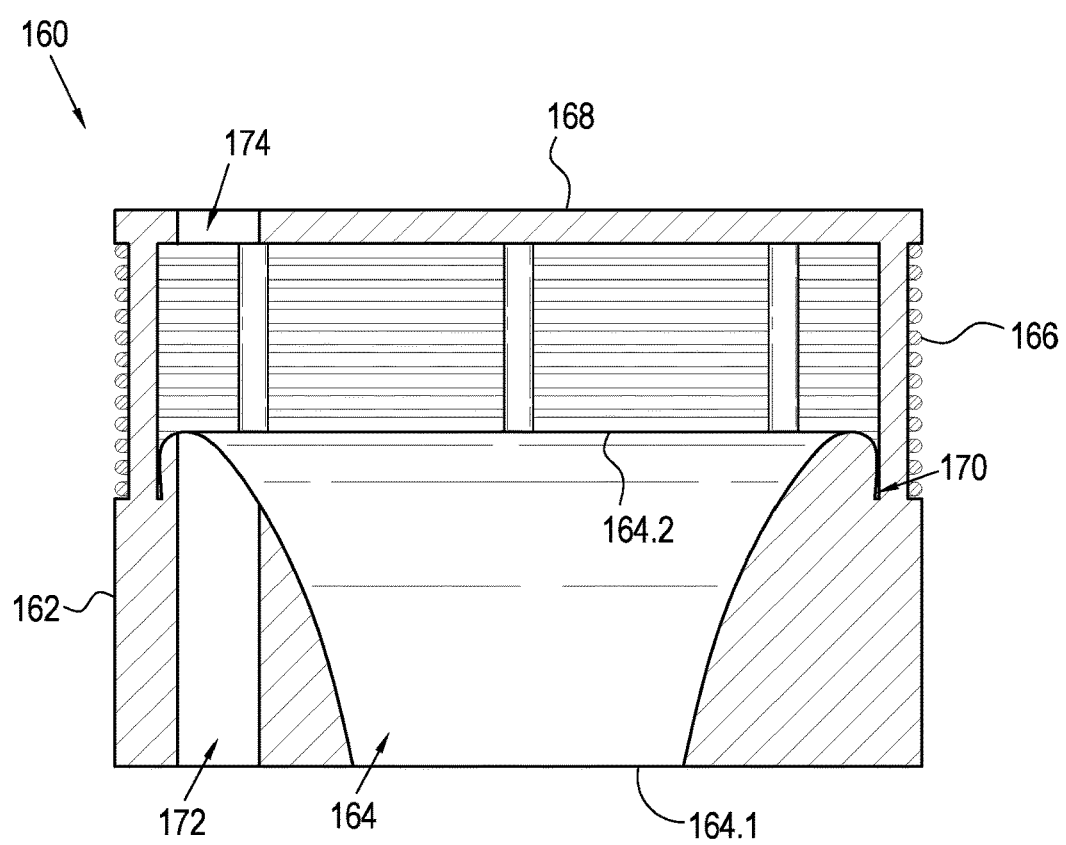
FIG. 8 shows a sectional elevation through the external air guide of FIG. 7.
Figure 9:
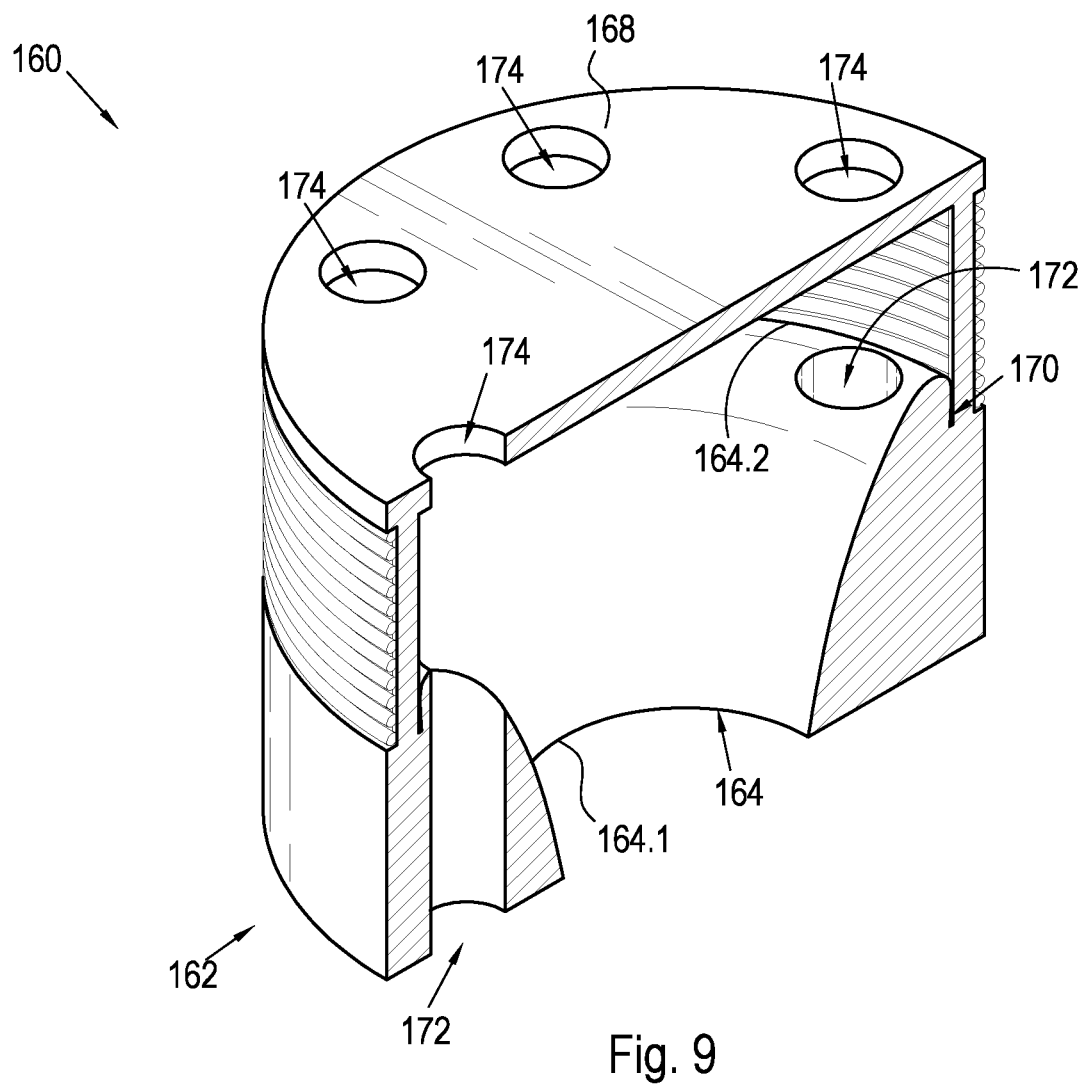
FIG. 9 shows a three-dimensional fragmentary view of the external air guide of FIG. 7.

As can best be seen in FIGS. 8 and 9 of the drawings an operatively inner end portion of the grid 166 extends axially longitudinally beyond an outer end of the body such that an annular space, generally indicated by reference numeral 170, is defined between a radially inner surface of the grid 66 and a protruding portion of the body. Depending on the valve and dimensions this space 170 could be excluded.

The body 162 is provided with holes 172 corresponding to holes 174 in the cover 162 and top 116.

In order to modify the valve 10, the cover 32 is removed by unscrewing the screws 176. Once removed, the cover 32 is replaced with the external air guide 160 by inserting screws through the holes 174, 172 into the holes in the top 116.

Figure 6:
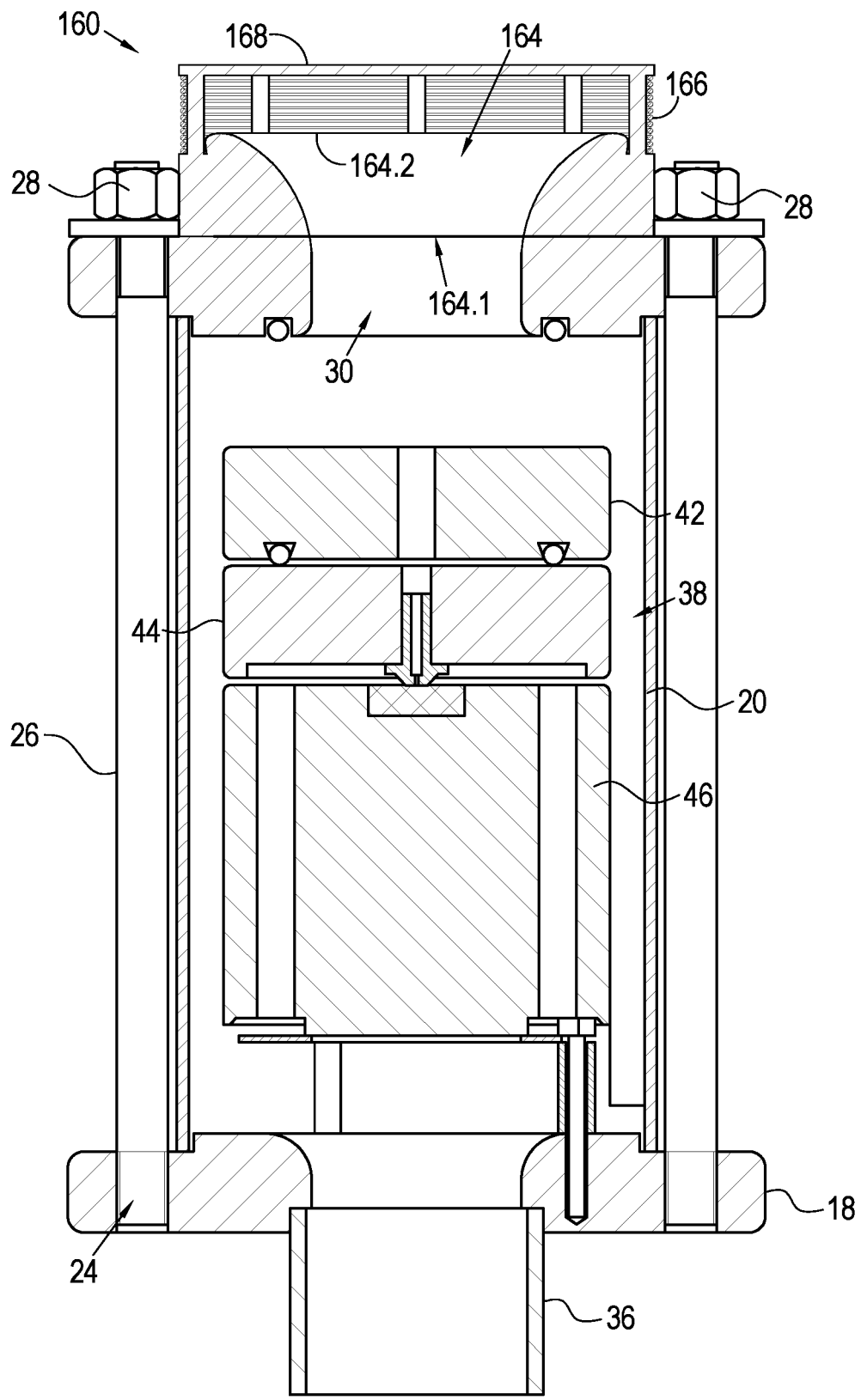
FIG. 6 shows a sectional view, similar to FIG. 1, of another embodiment of an air valve in accordance with the invention which incorporates an external air guide in accordance with the invention.
Figure 7:
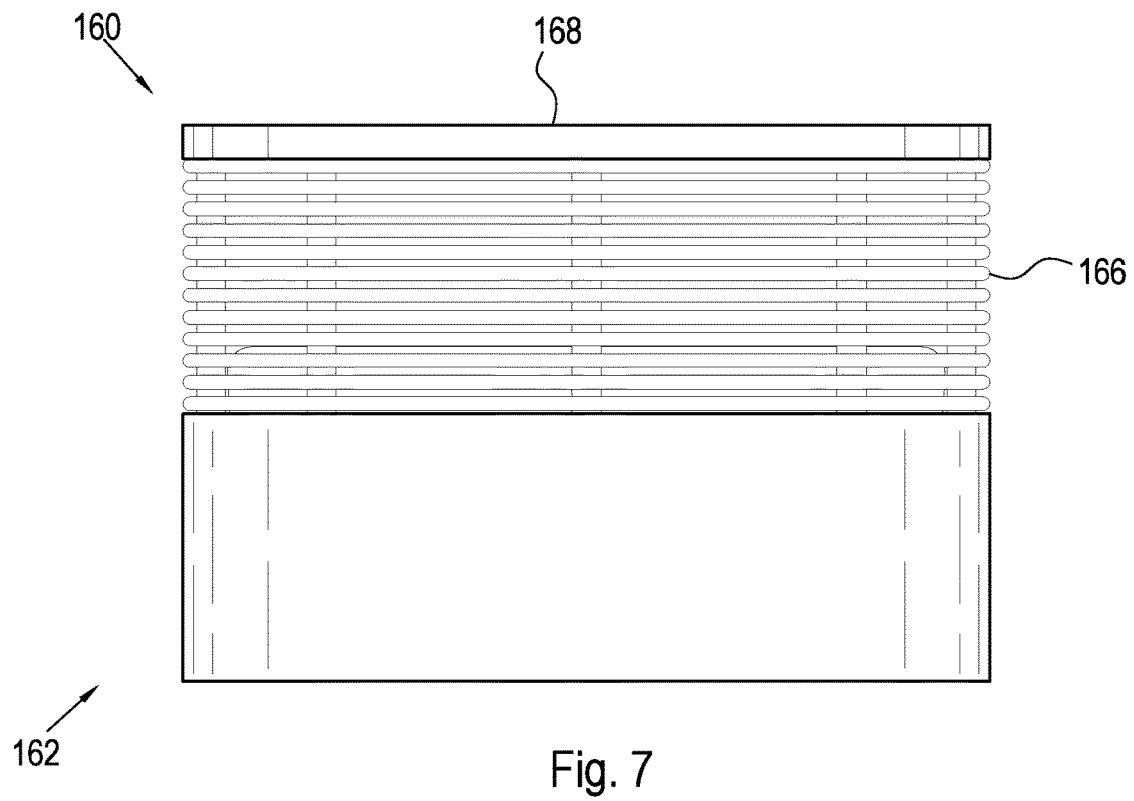
FIG. 7 shows a side view of the external air guide of FIG. 6.

As can be seen in FIG. 6 of the drawings, the inner end 164.1 of the flow path 164 has a diameter which corresponds substantially with the diameter of the top opening 30.

The smooth shape of the flow path 164 serves to improve air flow into the float chamber 14 and hence through the valve.

With regard to the equations set out above, it will be noted that the mass flow rate, i.e. air intake, is directly proportional to the discharge coefficient Cd.

Further, the discharge coefficient is dependent on the contraction coefficient and the Inventors accordingly believe that the provision of the external air guide 160 will improve the Cd and hence the mass flow rate of air into the air valve for a given size of top opening 30.

In the embodiment described above, the external air guide 160 is retrofitted to an existing air valve in order to improve the performance thereof. However, it will be appreciated, that an air valve can be manufactured in the first instance with an inlet opening which tapers from an outer end towards an inner end in order to improve air flow therethrough.

The external air guide 160 is typically manufactured as one piece, e.g. by injection moulding, additive manufacturing or in any other suitable way.

The air guide insert 70 and/or the external air guide 160 either separately or together form an air valve accessory which can be retrofitted to an existing air valve to improve the performance thereof. In other words, the air valve accessory in accordance with the invention could comprise one or both of the air guide insert 70 and external air guide 160.

Figure 10:
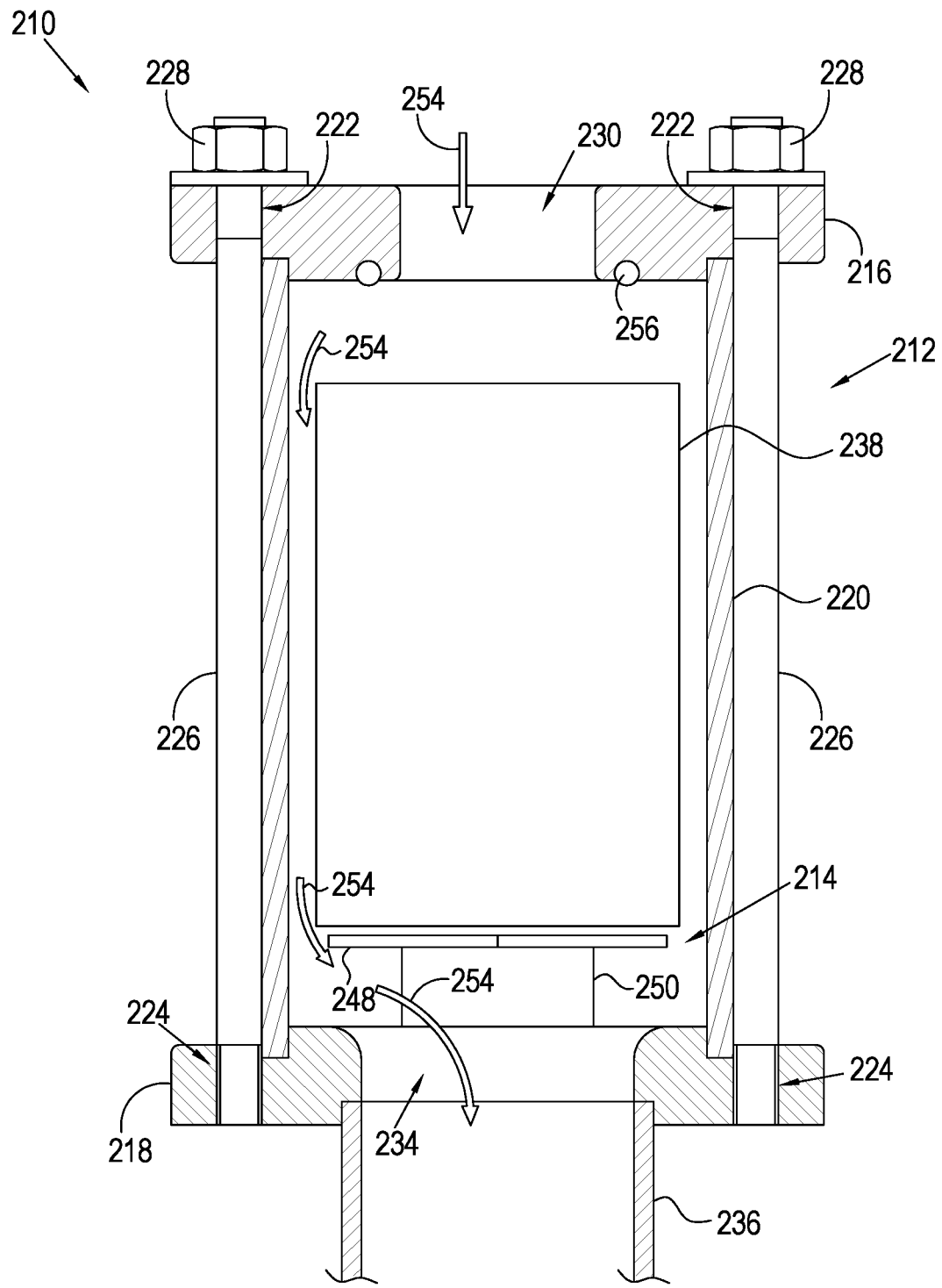
FIG. 10 shows a longitudinal section elevation of a further embodiment of an air valve in accordance with the invention.

Reference is now made to FIG. 10 of the drawings, in which reference numeral 210 refers generally to an air valve in accordance with another embodiment of the invention.

The air valve 210 includes a valve body, generally indicated by reference numeral 212, defining a float chamber, generally indicated by reference numeral 214.

More particularly, the valve body 212 has a circular top or upper flange 216, a circular bottom or lower flange 218 and a circular cylindrical sidewall or barrel 220.

The top 216 has a plurality of circumferentially spaced holes 222 extending therethrough. The bottom 218 has a plurality of circumferentially spaced threaded holes 224 therein, the holes 224 in the bottom 218 being in register with the holes 222. A stud 226 having a screw-threaded end is screwed into each of the holes 224, the studs extending through the holes 222 and nuts 228 are screw-threadedly mounted on protruding end portion of the studs 226 such that the sidewall 220 is sandwiched between the top 216 and bottom 218. It is also possible that the studs 226 could be positioned at the inside of 220, i.e. they could extend through the float chamber 214.

A top opening or top orifice 230 extends through the top 216 and a top cover (not shown) which incorporates a grid or sieve arrangement, as described above, is mounted to the top 216 in order to permit the flow of air through the top orifice 230 but inhibit the ingress of foreign matter into the valve body and in particular the float chamber 214.

A centrally disposed opening or bottom orifice 234 extends through the bottom 218 and is connected, in use, by a length of pipe 236 to a pipeline.

A float arrangement, generally indicted by reference numeral 238, is positioned in the float chamber 214. The float arrangement may comprise a single float element or a plurality of float elements.

In order to support the float arrangement 238 above the bottom 218, the valve 210 includes an annular baffle plate 248 which is supported above the bottom 218 by circumferentially spaced spacers 250.

In use, when a pipeline to which the air valve 210 is connected is empty and experiences atmospheric pressure inside the pipe, the float arrangement 238 will be in the position shown in the FIG. 10 in which the float arrangement 238 rests on the baffle plate 248. As liquid is introduced into the pipeline when filling the pipeline, the air contained therein is displaced and passes through the length of pipe 236 and the bottom orifice 234 into the float chamber 214. Air passing through the bottom orifice 34 is deflected laterally by 248 and passes through the annular space defined between the radially outer edge of the float arrangement and the radially inner surface of the sidewall 220. As the air passes an upper edge of the float arrangement 238 it is directed inwards and is partially deflected laterally inwardly by the bottom of the top 216 where it passes through the top orifice 230 and is displaced laterally outwardly through the top orifice When all the air has been released through the air valve and as the liquid enters the float chamber 214 through the bottom orifice 234 the liquid level in the float chamber 214 rises, the float arrangement 238 is displaced upwardly due to the buoyancy forces acting thereon until the top float arrangement 238 abuts against an annular seal 256 provided on the top 216 thereby effectively closing the top orifice 230.

The air valve 210 is typically located at a high point in the pipeline such that any gas/air within the pipeline which will be displaced during the filling or transported hydraulically, accumulates at the high point and enters the float chamber 214 thereby displacing the liquid contained within the float chamber 214. Should the liquid level within the float chamber 214 fall below a certain level such that the float arrangement 238 moves downwardly, air which is accumulated in the float chamber 214 will be expelled through the top orifice 230 and the float arrangement 238 will once again move upwardly as the liquid level rises in order to close the top orifice 230.

If the pipeline is being emptied or partially emptied and the pressure inside the air valve drops below atmospheric or the liquid level drops within the float chamber 214, the float arrangement 238 will move downwardly permitting air to enter the float chamber 214 through the top cover 232 and the top orifice 230. The air will flow into the float chamber 214 through the top orifice 230 along the path shown by arrow 254 and exit the float chamber through the bottom orifice 234.

The intake capacity of an air valve is regarded as the most important operational characteristic when determining the air valve size. In this regard, reference is made to the European standard prEN 1074-4 Part 4 Final Draft (February 2000) procedure for determination of the intake capacity of air valves, in which it is indicated that the top orifice is the controlling orifice, defining the intake characteristics.

In designing an air valve, the top orifice is assumed to be the control point, i.e. the point which regulates the maximum flow rate of air through the valve. To ensure that this is in fact the case, the diameters of the top orifice 230 and bottom orifice 234 are selected to ensure that flow through the bottom orifice is less restricted than flow through the top orifice. To this end, the diameter of the bottom orifice 234 is selected to be larger than that of top orifice 230.

It will be appreciated that an air valve designed in accordance with the invention will have a top orifice 230 smaller than the bottom orifice 234 and that the appropriate diameters for any specific layout is covered by this invention. However, the invention also extends to a method of modifying an existing air valve which may include replacing one or both of the upper flange 216 and lower flange 218, but preferably increasing the size of the bottom orifice 234 to ensure that the inlet or top orifice 230 functions as the hydraulic control.

The Inventors believe that an air valve in accordance with the invention will reduce the risk associated with an undersized air valve being specified for any particular application.

Figure 11:
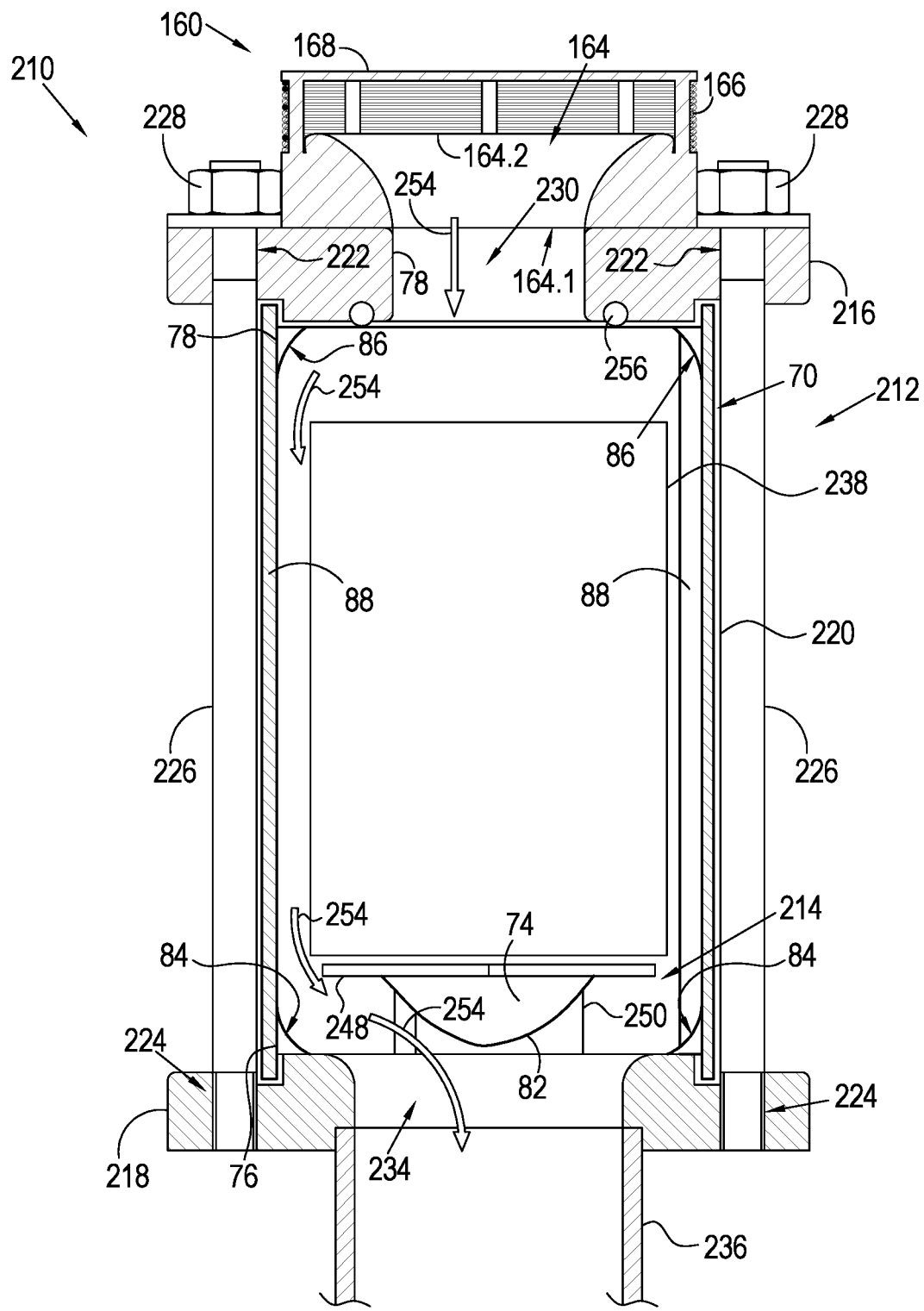
FIG. 11 shows a longitudinal sectional elevation of a still further embodiment of an air valve in accordance with the invention.

It will be appreciated that, as illustrated in FIG. 11 of the drawings, the valve 210 could be modified by supplying an air valve accessory comprising one or both of the air guide insert 70 and external air guide 160 and mounting the air guide insert and/or external air guide in position as described above which the Inventors believe would further enhance the efficiency of the valve.

The Inventors believe that the invention will provide a cost-effective manner of improving the performance of an air valve. In addition, by virtue of the improved performance of a valve designed in accordance with the invention, a smaller air valve is able to achieve the desired flow rates which in turn leads to a cost saving.

The invention claimed is:

1. An air valve accessory for an air valve having a valve body defining a float chamber and having a top opening, the air valve accessory comprising:
   an air guide insert which can be positioned in the float chamber of the air valve and which is configured to improve a flow of air through the air valve, the air guide insert including:
   a center element;
   a support arrangement extending upward and downward within the float chamber to support the center element in a desired position which is within the float chamber and which is spaced apart from an outlet orifice in a bottom of the air valve; and
   an annular upper element which is configured to be positioned adjacent to a corner formed between a top and a sidewall of the air valve and which has an annular inner surface which serves to smooth the flow of air;

wherein the support arrangement includes circumferentially spaced apart elongate support members which are connected to the center element and the annular upper element.

2. An air valve accessory as claimed in claim 1, in which the air guide insert is formed of a synthetic plastics material.

3. An air valve accessory as claimed in claim 1, further comprising an external air guide which can be positioned adjacent to the top opening of the air valve and outside of the float chamber, wherein the external air guide is configured to improve the flow of air from atmosphere into the air valve, the external air guide including a body which defines a flow path which extends through the body of the external air guide and which has an inner end and an outer end which open out of the body of the external air guide, the flow path having a transverse cross-section, an area of which decreases smoothly from an outer end thereof to an inner end thereof, the flow path having a curvature, a shape of the curvature being defined by a bottom nappe of the flow lines when excessive turbulence is prevented.

4. An air valve accessory as claimed in claim 3, in which the external air guide includes a sieve or grid connected in flow communication with the outer end of the flow path, the sieve or grid being connected to the body of the external air guide, the sieve or grid being annular, and an axially inner portion of the sieve or grid extending longitudinally inwardly beyond an outer end of the body of the external air guide.

5. An air valve accessory as claimed in claim 1, wherein the air guide insert further includes an annular lower element which is configured to be positioned adjacent to a corner formed between the bottom of the air valve and the sidewall of the air valve and which has an annular inner surface which serves to smooth the flow of air.

6. An air valve accessory as claimed in claim 5, in which the center element has a downwardly facing deflector surface, a width of which increases away from a central point to a periphery thereof, the deflector surface being generally in a form of an inverted dome, a shape of the inverted dome being configured to guide the flow of air towards an annulus space on an inside of the valve body and being formed in such a way that it can be inserted into and fitted within the dimensional form of the air valve.

7. An air valve accessory as claimed in claim 5, wherein the inner surface of the upper element is concave to smooth air flow between the float chamber and the outlet orifice.

8. An air valve accessory as claimed in claim 5, wherein the support arrangement includes angularly spaced apart radial ribs which are connected to and extend between the center element and the lower element, and which serve to maintain the center element and the lower element in a desired spatial relationship in which they define between them an annular flow path which leads from the inlet orifice to a position adjacent to a float support.

9. An air valve accessory as claimed in claim 5, wherein the air valve accessory is formed of a synthetic plastics material.

10. A method of modifying an air valve having a body defining a float chamber and having a top opening, the method comprising:
at least one of
positioning an air guide insert within the float chamber, which air guide insert is configured to smooth a flow of air through the float chamber, and
positioning an external air guide adjacent to the top opening and outside of the float chamber in order to improve the flow of air through the top opening and into the air valve; and
replacing a top and/or a bottom of the air valve with a replacement top and/or bottom such that a top orifice has a smaller cross-sectional area than a bottom orifice.

11. The method as claimed in claim 10, wherein the air guide insert and/or the external air guide are part of an air valve accessory.

12. The method as claimed in claim 10, further comprising removing an existing sieve or grid from a valve body and mounting an external air guide of an air valve accessory to a top plate with a passage in the valve body aligned with a top opening in the top plate.

13. An air valve which includes:
a valve body defining a float chamber within which a float arrangement is provided;
a lower opening which leads from the float chamber and which is connected or connectable to a pipeline;
an upper opening leading from the float chamber at a high level which is connected or connectable to atmosphere;
a deflector surface which faces the lower opening, a width of which increases away from a central point to a periphery thereof, the deflector surface being generally in a form of an inverted dome, a shape of the inverted dome being configured to guide the flow of air towards an annulus space on an inside of the valve body and being formed in such a way that it can be inserted into and fitted within the dimensional form of the air valve; and
a support arrangement that is coupled to the deflector surface and that extends upward from the deflector surface and downward from the deflector surface within the float chamber to support the deflector surface in a desired position within the float chamber, the support arrangement being connected to an annular lower element that is inserted into the float chamber.

14. The air valve as claimed in claim 13, in which the valve body comprises a circular bottom, a circular top and a circular cylindrical side wall which extends between the top and the bottom, the intersections between the sidewall and at least one of the top and the bottom being concave to provide a curved surface to smooth airflow and prevent the build-up of stagnant areas or eddies in the float chamber.

15. The air valve as claimed in claim 13, in which at least part of the upper opening has a transverse cross-section which increases away from the float chamber in order to smooth airflow through the upper opening into the float chamber and/or from the float chamber out of the upper opening.

16. The air valve as claimed in claim 13, in which the lower opening is of a larger diameter than a minimum diameter of the upper opening.

* * * * *